United States Patent Office.

GUSTAVE DE VILLEPOIX, OF ABBEVILLE, (SOMME,) AND JOSEPH FRANÇOIS BONNATERRE, OF PARIS, FRANCE.

*Letters Patent No. 77,805, dated May 12, 1868.*

IMPROVED LIQUID EXTRACTS FROM VEGETABLES.

*The Schedule referred to in these Letters Patent and making part of the same.*

TO ALL WHOM IT MAY CONCERN:

Be it known that we, GUSTAVE DE VILLEPOIX, of Abbeville, (Somme,) in the French Empire, apothecary, and JOSEPH FRANÇOIS BONNATERRE, of Paris, in the French Empire, civil engineer, have invented new and useful Improvements in Liquid Extract from Vegetables; and we do hereby declare that the following is a full, clear, and exact description of the same.

This invention consists in the preparation of an aromatic liquid which we term "extract from vegetables," as it is a product resulting from the distillation of the vegetables and condiments used for culinary purposes.

The intent of this liquid is to procure to the consumers of the extract from viands (Liebig) or of any other similar preparation, a ready and thorough substitute for the "*pot au feu,*" whereby may be prepared immediately a potage yielding the same savors as the best home gravy-soup, (*consommé.*)

In order to invest our product with the same qualities of economy and simplicity which characterize the extract from viands, such as Liebig's, we have chiefly contrived also to prepare our extract from vegetables in a condition of great concentration and inalterability.

We give hereafter one instance of our method of preparing an extract from vegetables, but it will be easily understood that the nature of the extract, the proportions of vegetables and condiments, will vary according to the wants, and therefore we intend to give the following statement merely as one example of our improved method of preparing the extract from vegetables.

Into a still, made of well-tinned copper, or into any other suitable culinary utensil provided with a double bottom, we throw from sixteen to seventeen gallons of water.

Common salt, four pounds.
Turnips, thirty-six pounds.
Leeks, sixteen pounds.
Onions, one and a half pound.
Celery, six pounds.
Parsley, one pound.
Cloves, two hundred.
Garlic, eight cloves or seventy-five aglets.

We distill on a slow fire, so as to extract seven gallons therefrom.

The aromatic liquor is to be admitted (and this is one of the main features of the new extract) into a vessel containing, previously, Common salt, twenty-four pounds.
Refined sugar, sixteen pounds.

These substances will preserve, when being prepared, their whole aroma, and prevent any fermentation of the above liquor.

When the distillation as above has yielded seven gallons, and the aromatic liquid mixed with the salt and sugar which it holds in solution, it will mark 30° by the acrometer of Baumé.

The addition of salt in the first preparation or maceration-water is intended to raise the boiling-point of the water, in order to permit the volatilization or distillation of the essential oils and aromatic properties of the ingredients therein.

Claims.

1. As a new article of manufacture, the herein-described liquid extract of vegetables, as and for the purpose described.

2. The herein-described process for preparing the said liquid extract of vegetables, as and for the purpose described.

3. The combination, with the said liquid extracts of vegetables, of a solution of salt and sugar, substantially as and for the purpose described.

G. DE VILLEPOIX,
BONNATERRE.

Witnesses:
  A. GUION,
  DEMOS.